(12) United States Patent
Rondinella et al.

(10) Patent No.: US 6,591,039 B2
(45) Date of Patent: Jul. 8, 2003

(54) METHOD AND EQUIPMENT FOR WRITING A BRAGG GRATING IN A WAVEGUIDE

(75) Inventors: Elisabetta F. Rondinella, Milan (IT); Maurizio Tormen, Belluno (IT)

(73) Assignee: Corning Oil SpA, Milan (IT)

( * ) Notice: Subject to any disclaimer, the term of this patent is extended or adjusted under 35 U.S.C. 154(b) by 0 days.

(21) Appl. No.: 09/991,451

(22) Filed: Nov. 16, 2001

(65) Prior Publication Data

US 2003/0007729 A1 Jan. 9, 2003

Related U.S. Application Data

(60) Provisional application No. 60/252,100, filed on Nov. 21, 2000.

(30) Foreign Application Priority Data

Nov. 16, 2000 (EP) .............................................. 00124990

(51) Int. Cl.[7] ................................................ G02B 6/34
(52) U.S. Cl. ......................... 385/37; 359/563; 359/566; 359/569; 430/290
(58) Field of Search ...................... 385/37, 10; 359/566, 359/568, 569, 572, 573, 575; 430/290

(56) References Cited

U.S. PATENT DOCUMENTS

| | | | | |
|---|---|---|---|---|
| 5,903,689 A | * | 5/1999 | Painchaud et al. | 385/37 |
| 5,912,999 A | * | 6/1999 | Brennan et al. | 385/37 |
| 6,072,926 A | * | 6/2000 | Cole et al. | 385/37 |
| 6,130,973 A | * | 10/2000 | Lauzon et al. | 385/37 |
| 6,169,830 B1 | * | 1/2001 | Kewitsch et al. | 385/37 |
| 6,229,941 B1 | * | 5/2001 | Yoon et al. | 385/37 |
| 6,284,437 B1 | * | 9/2001 | Kashyap | 430/321 |
| 6,384,977 B1 | * | 5/2002 | Laming et al. | 359/570 |
| 6,501,883 B1 | * | 12/2002 | Painchaud et al. | 385/37 |
| 2001/0051020 A1 | * | 12/2001 | Kashyap | 385/37 |

FOREIGN PATENT DOCUMENTS

| | | | | |
|---|---|---|---|---|
| EP | 0 978 738 A1 | * | 9/2000 | G02B/6/16 |
| EP | 1139123 A1 | * | 10/2001 | G02B/6/16 |
| WO | WO 00/02068 | * | 1/2000 | G02B/5/18 |
| WO | WO 00/26703 | * | 5/2000 | G02B/5/18 |

* cited by examiner

Primary Examiner—Hemang Sanghavi
Assistant Examiner—Scott A Knauss
(74) Attorney, Agent, or Firm—Svetlana Z. Short

(57) ABSTRACT

A method for writing a Bragg grating in a waveguide comprises the steps of placing the waveguide in a writing position in which the waveguide extends essentially along one axis; generating a beam of ultraviolet radiation; executing a first and a second scan with the said beam along the waveguide through a phase mask, in such a way as to generate interference fringes capable of modifying the refractive index along the said waveguide in a predetermined way; moving the phase mask, during the first or the second scan, with an oscillatory motion about one of its equilibrium positions and along a direction lying at an angle of less than 90° to the axis of the said waveguide, in such a way as to produce, in this scan, an essentially zero envelope of the refractive index; and varying the intensity of the energy of the ultraviolet radiation in a controlled way along the waveguide during the first and the second scan, for example by controlling the scanning velocity.

20 Claims, 8 Drawing Sheets

Fig. 4

METHOD AND EQUIPMENT FOR WRITING A BRAGG GRATING IN A WAVEGUIDE

CLAIM OF PRIORITY

This application claims the benefit of priority under 35 USC §119 of European Patent Application Serial Number EP00124990.3, filed on Nov. 16, 2000. This application claims the benefit of priority under 35 USC §119 (e) of U.S. Provisional Application Serial No. 60/252,100 filed on Nov. 21, 2000.

BACKGROUND OF INVENTION

The present invention relates to a method an equipment for writing a Bragg grating, particularly an apodized Bragg grating, in a waveguide. In the course of the present description, reference will be made to optical fibres, but this reference should be understood as providing an example rather than being limiting, since the technology described is equally applicable to waveguides in integrated optical systems.

Typically, the optical fibres used for telecommunications are doped with germanium, which induces a property of photosensitivity to UV radiation. In order to write a Bragg grating in an optical fibre, this property is used to modify the refractive index locally by means of UV illumination.

As is known, an in-fibre Bragg diffraction grating is a length of fibre which has an essentially periodic longitudinal modulation of the refractive index in its core. This structure has the property of retroreflecting the light in a wavelength band centred on the Bragg wavelength. The Bragg wavelength, as is know (for example, from Report 3.3 in the publication "Fiber Bragg Gratings", by Andreas Othonos and Kyriacos Kalli, Artech House, Boston/London, 1999) can be expressed as follows:

$$\lambda_B = 2 \cdot n_{eff} \cdot \Lambda \quad (1)$$

where $n_{eff}$ is the effective refractive index and $\Lambda$ is the spatial period of the diffraction grating.

Additionally, as is know (from Report 3.4 of the aforesaid publication "Fiber Bragg Gratings", for example), in the most general case the variation of the refractive index n along the axis z of the fibre core can be expressed by the following relation (which shows all the possible dependences of the variable z):

$$n(z) = n_0(z) + \Delta n(z) \sin(2\pi z / \Lambda(z)) \quad (2)$$

where $n_0(z)$ is the mean local value of the refractive index and $\Delta n(z)$ represents the local envelope of the refractive index. The effective refractive index $n_{eff}$ of relation (1) is proportional to the mean refractive index $n_0(z)$ of relation (2) by a term defining the confinement (typically indicated by $\Gamma$) of the fundamental mode of the fibre.

Uniform gratings, gratings known as "chirped", and apodized gratings are known and can be distinguished by the variation of the refractive index.

In uniform gratings, the terms $n_0(z)$, $\Delta n(z)$ and $\Lambda(z)$ are constant, as shown in FIG. 1a, which shows the typical variation of the refractive index n (normalized to 1) as a function of the co-ordinate z (expressed in arbitrary units). Additionally, as shown in FIG. 1b, the reflection spectrum of a uniform grating typically has a central peak at the Bragg wavelength and a plurality of secondary lobes. These secondary lobes can be disadvantageous is some applications, for example when the Bragg grating is used to filter a channel (at a corresponding wavelength) in a multi-channel optical transmission system. This is because, in this case, the secondary lobes of the reflection spectrum introduce an undesired attenuation into the transmission channels adjacent to those which are to be filtered.

In apodized gratings, the term $\Delta n(z)$ is variable, and the refractive index n(z) has a variation of the type shown qualitatively in FIG. 2a (in which n is normalized to 1 and z is expressed in arbitrary units). The refractive index therefore shows an envelope corresponding to a predetermined curve. A typical variation of the reflection spectrum of an apodized grating is shown in FIG. 2b. It is clear that a suitable modulation of the term $\Delta n(z)$ enables the secondary lobes to be reduced around the principal reflection peak. A grating of this type can therefore be used advantageously for channel filtering in a multi-channel system, thus reducing the aforesaid problem of the attenuation of the channels adjacent to the filtered channel.

In chirped gratings, one or the other of the terms $n_0(z)$ and $\Lambda(z)$ is variable. Owing to this variability, and since the Bragg wavelength is proportional, for the reasons stated above, to the product of $n_0(z)$ and $\Lambda$, the reflection bands of these gratings are wider than those of uniform gratings. FIGS. 3a, 3b, 3c show, respectively, the qualitative variation of the refractive index in the case in which the term $n_0(z)$ is modulated, the variation of the same parameter in the case in which the term $\Lambda(z)$ is modulated (with a continuous variation from approximately 500 nm to approximately 502 nm, for example), and the typical reflection spectrum of a chirped grating. As can be seen in the spectrum of FIG. 3c, the reflection peak is considerably widened. A grating of this type can therefore be used as a wide-band reflection filter or, more typically, as a chromatic dispersion compensation device. If the term $\Delta n(z)$ is also modulated, the grating bercomes a chirped apodized grating.

There are various known techniques for writing an apodized Bragg grating. In these techniques, the fibre is exposed to suitably shaped UV interference fringes, to produce a corresponding variation of the refractive index, and particularly of the local envelope $\Delta n(z)$.

The known techniques essentially fall into two categories: interferometric techniques and phase mask techniques.

Interferometric techniques essentially consist in dividing a UV beam into two components and making them strike the fibre at a predetermined relative angle, thus generating the interference fringes which induce the desired variation of the refractive index. These techniques are highly versatile, since by varying the relative angle between the two components it is possible to vary the parameters of the grating, particularly its period.

However, interferometric techniques are poorly suited to serial production, since the "set-up" for writing is particularly sensitive to external factors (temperature, vibrations, etc.), so that the parts require frequent realignment. The application of these techniques is therefore essentially limited to the research field.

The phase mask techniques are generally considered more suitable for large-scale production, owing to the high repeatability, the lower susceptibility to external factors, and the fact that the UV beams require a lower coherence length.

A phase mask is a quartz substrate on whose surface there is a series of rectilinear projections running in a principal direction and parallel to each other, and forming, in section, a profile which is essentially of a square wave type. These projections are typically equally spaced and of equal height in a uniform mask, at variable intervals in the case of a chirped mask, and of variable height in an apodized mask.

To write the grating, the phase mask is usually positioned facing the portion of fibre concerned, and orientated in such a way that its principal direction (as defined above) is parallel to the fibre axis. When the UV radiation passes through it, the phase mask generates at its output interference fringes with an essentially sinusoidal variation and with a period Λ equal to half of the period $\Lambda_m$ of the projections of the mask. In greater detail, the electromagnetic radiation leaving the phase mask can be subdivided into different orders m associated with corresponding propagation angles $\theta_m$ according to the relation $$\sin\theta_m = m\frac{\lambda}{\Lambda} \quad (3)$$

The aforesaid fringes are generated from the orders +1 and −1 (values+1 and −1 of m), while the other orders, particularly the zero order, are unwanted, since they tend to diminish the visibility v of the fringes. The visibility v is defined, in a first approximation, by the following relation:

$$v = \frac{I_{\max} - I_{\min}}{I_{\max} + I_{\min}} \quad (4)$$

where $I_{max}$ and $I_{min}$ are, respectively, the peak intensity and the valley intensity of the fringes.

In general, phase masks are designed in such a way as to reduce (typically by approximately 1% to 3%) the transmitted zero order and to maximize (typically with an increase of approximately 30% to 40%) the quantity of light of the orders +1 and −1.

The article by J. Hübner, M. Svalgaard, L. G. Nielsen and M. Kristensen, "Phenomenological Model of UV-induced Bragg Grating Growth in Germanosilicate Fibers", SPIE Vol. 2998, describes a model for the growth behaviour of Bragg gratings in a germanosilicate fibre when the phase mask technique is used. The authors of this article conducted experiments in which the fibre was illuminated with an excimer laser (of the ArF or KrF type) or a doubled frequency argon laser (FRED). In the case of the excimer laser, the laser beam was shaped by means of two cylindrical lenses in such a way that it had a cross section whose dimensions were equal to the length of the grating to be written, the fibre was positioned centrally with respect to the beam and the phase mask was positioned in contact with the fibre. In the case of the FRED laser, the beam was shaped by means of a cylindrical lens on a line parallel to the axis of the fibre and the phase mask was positioned at approximately 100 μm from the fibre.

Some known techniques for writing apodized gratings by means of phase masking are described below.

A first technique consists in the use of apodized phase masks. Apodized phase masks are masks with a variable diffraction efficiency. In this technique, by contrast with the normal situation, use is made of variations of intensity of the beams of the orders −1 and +1 to modulate the visibility of the fringes along the fibre axis according to the desired apodization profile. The article by Albert et al., "Apodisation of the spectral response of fibre Bragg gratings using a phase mask with variable diffraction efficiency", Electronics Letters, vol. 31, no. 3, 1995, pp. 222, 223, describes the production of apodized gratings by this technique. In particular, this article proposes the production of apodized masks in which the depth of the projections is variable.

The applicant considers that this technique, although it provides a relatively high degree of repeatability and a relatively simple production process, is very inflexible in respect of the apodization profile that can be obtained, since this is fixed by the particular shaping of the phase mask. The applicant has also noted that apodized phase masks are very expensive and more subject to damage than other types of mask.

A second technique, described in the article by Malo et al., "Apodised in-fibre Bragg grating reflectors photoimprinted using a phase mask", Electronics Letters, vol. 31, no. 3, pp. 223–225, 1995, consists in the production of an apodized grating by a double exposure which makes it possible to obtain an essentially constant mean value of the refractive index. The first exposure is carried out with the use of an amplitude mask in which the transmissivity along its principal axis is variable according to the desired apodization profile, and the subsequent exposure is carried out with the use of a second amplitude mask whose transmissivity is complementary to the first.

In this case also, since a specific amplitude mask is required for each type of apodization and for each grating length, the applicant considers that the proposed technique has little flexibility.

International patent application WO 98/08120 in the name of Pirelli Cavi e Sistemi S.p.A. describes a technique called the "Continuous Fiber Grating Technique", in which a fibre exposed through a mask to a UV radiation modulated periodically over time, is translated continuously along its axis (by means of a slide controlled by an interferometric system) in such a way that successive exposures produce superimposed fringes. This technique enables an apodized grating to be produced by causing an oscillation of the position of writing on the fibre.

This technique, while providing a high degree of flexibility in respect of the apodization profiles which can be obtained, requires expensive equipment.

The article by Cole et al., "Moving fibre/phase mask-scanning beam technique for enhanced flexibility in producing fibre gratings with uniform phase mask", Electronics Letters, vol. 31, no. 17, pp. 1488–1489, 1995, describes a technique for writing apodized gratings providing the scanning of a laser beam parallel to the axis of the fibre and its passage through a phase mask facing the fibre, and also a relative movement between the fibre and mask parallel to the axis of the fibre. The velocity of movement of the fibre relative to the mask is much lower than the laser beam scanning velocity. By controlling this relative movement, it is possible to produce chirped, apodized and phase step gratings.

U.S. Pat. No. 5,912,999 describes a method for writing relatively long gratings. In this technique, the fibre is moved longitudinally at controlled velocity relative to the mask, and the illuminating laser beam is amplitude modulated in order to produce apodized gratings.

With regard to this technique, the applicant considers that the modulation of the energy induces a modulation of the mean refractive index $n_0(z)$ and, consequently, the growth of undesired lobes at wavelengths shorter than the central wavelength.

EP 0684491 describes a method of writing Bragg gratings, in which the fibre is illuminated with interference fringes generated by the passage of electromagnetic radiation through a phase mask orientated in such a way that its diffracting elements are inclined at a predetermined angle (typically a right angle) to the axis of the fibre. During writing, the distance between the phase mask and the fibre is progressively varied, by means of a piezo-electric device, with a ramp variation. This relative movement, of the order of some tens of micrometers, is provided in order to reduce the sensitivity of the writing of the grating to the distance between the phase mask and the fibre.

The applicant notes that this method does not provide any apodization of the grating. The applicant also notes that the movements provided by this technique in other words movements up to a maximum of 50 μm, are not sufficient to significantly modify the visibility of the fringes. This movement therefore only permits an average operation of the interference fringes.

International patent application WO 00/02068 describes a grating formed in an optical waveguide having a photosensitive core. A beam of actinic radiation, suitably shaped and filtered, is used to generate, by means of an optical system comprising a beam splitter, mirrors and lenses, or by means of a lens and a phase mask, two optical beams which are inclined with respect to each other and which interfere with each other on the photosensitive core. The peak intensities of the interfering beams are spaced apart along an optical axis of the waveguide, to reduce the lateral lobes of the spectral response of the grating by a smoothing of the mean refractive index. A second exposure with the two beams, but without the effect of interference between the beams, causes a further smoothing of the refractive index.

The applicant considers that the modulation of the refractive index obtainable by this writing process is significantly dependent on the shape of the optical beam which is generated, and on the characteristics of the writing device, and this technique therefore has limited flexibility. In particular, the applicant considers that this technique may require a hardware modification of the grating writing equipment in order to produce gratings of different length or with a different apodization profile. Moreover, since essentially the whole of the actinic radiation beam generated by the laser source is used in this process, the non-uniformities and asymmetries of the beam can affect the resulting grating.

The applicant has tackled the problem of providing a technique for writing a Bragg grating, particularly an apodized Bragg grating, in a waveguide, by means of which gratings having desired spectral characteristics (in other words gratings which have a predetermined variation of the refractive index) can be generated with a high process flexibility and high repeatability, without requiring highly precise alignment or expensive equipment.

The applicant has found a technique which meets the aforesaid requirements. In this technique, two successive scans of a beam of ultraviolet radiation are carried out along a photosensitive portion of the waveguide through a phase mask. During one of the two scans (for example, the first), the phase mask is made to oscillate about its equilibrium position, with an oscillation component parallel to the waveguide, in such a way that the interference fringes have a displacement relative to each other such that the refractive index has an essentially zero envelope as a result of this scanning. This scanning therefore permits control of the local mean refractive index, while the other scanning (carried out with the mask fixed) is used to obtain the desired envelope of the refractive index and, consequently, the desired apodization of the grating.

The two scans are carried out with control of the intensity of the ultraviolet radiation energy which strikes the fibre locally during each of the two scans, achieved by controlling the scanning velocity or by controlling the intensity of the beam of ultraviolet radiation. It is therefore possible to have variable and different velocities, or variable and different beam intensities, during the two scans.

In the case of variable velocities, the variation of the velocity in the oscillating mask scan is selected in such a way as to pre-compensate (or compensate if the scan in question is the second one) the variation of the local mean value of the refractive index associated with the other scan, in such a way that, at the end of the double scan, there is a predetermined variation of the local mean value of the refractive index (for example, a constant value as in the case of the apodized profile in FIG. 2a). During the fixed mask scan, the scanning velocity is selected in such a way that the sinusoidal modulation of the refractive index due to the mask has an envelope equal to the desired apodization. The variation of the local mean value of the refractive index produced by the fixed mask scan depends on the desired apodization.

In the case of variable beam intensities, the criterion for selecting the law of variation of the intensity during the two scans is essentially the same as that for the velocities. The intensity of the laser beam can be controlled, for example, by a variable attenuation of the beam.

Therefore, the oscillatory movement of the phase mask and the control of the intensity of the ultraviolet radiation energy in the fibre during the two scans, achieved by controlling the scanning velocity or, alternatively, by controlling the attenuation of the laser beam, makes it possible to obtain the desired variation of the refractive index.

SUMMARY OF THE INVENTION

In a first aspect, the present invention relates to a method for writing a Bragg grating in a waveguide, comprising:

placing a photosensitive waveguide in a writing position in which the said waveguide extends essentially along one axis;

generating a beam of ultraviolet radiation;

executing a first and a second scan of the said beam along the said photosensitive waveguide through a phase mask, to generate interference fringes capable of modifying the refractive index along the said waveguide in a predetermined way; and moving the said phase mask, during one of the said first and second scans, with an oscillatory motion about one of its equilibrium positions and along a direction of movement lying at an angle of less than 90° to the said axis.

Preferably, the method also comprises the variation of the energy of the said ultraviolet radiation along the said portion of photosensitive waveguide during at least one of the said first and second scans.

The said step of varying the energy of the said ultraviolet radiation along the said portion of photosensitive waveguide can comprise varying the scanning velocity of the said beam or, alternatively, varying the intensity of the said beam, preferably by applying a variable attenuation to the said beam.

Preferably, the said direction of movement lies at an angle of more than 0° to the said axis, and the method comprises translating the said phase mask along the said direction of movement, before at least one of the said first and second scans, to position the said phase mask at a predetermined distance from the said fibre.

The amplitude and frequency of the said oscillatory movement are advantageously selected in such a way that the said interference fringes have essentially random phases with respect to each other.

The method preferably also comprises transmitting the said beam through a slit of predetermined dimensions.

The said step of executing a first and second scan with the said beam can comprise the steps of deflecting the said beam by means of a mirror and translating the said mirror parallel to the said portion of photosensitive waveguide.

The said second scan is preferably carried out in the direction opposite that of the said first scan.

According to a further aspect, the present invention relates to equipment for writing a Bragg grating in a waveguide, comprising:

an emitter of a beam of ultraviolet radiation;

supporting elements for the said waveguide to place a portion of photosensitive waveguide in a writing position essentially along a predetermined axis and along a path of the said beam;

a phase mask placed on the said path in a position such that it faces the said portion of photosensitive waveguide when the said portion of photosensitive waveguide is in the writing position; and means for scanning the beam along the said portion of photosensitive waveguide through the said phase mask; and a movement device carrying the said phase mask and capable of moving the said phase mask with an oscillatory motion in a direction lying at an angle of less than 90° to the said axis.

Advantageously, the said movement device is capable of translation in the said direction to position the said phase mask at a predetermined distance from the said fibre.

Additionally, the said movement device preferably comprises a first motorized slide.

The equipment preferably also comprises a screen provided with a slit positioned on the said path before the said phase mask, the said slit having a dimension smaller than the cross section of the said beam.

The said scanning means preferably comprise a second motorized slide carrying the said screen and having a direction of movement orthogonal to the said beam so that the said slit can be positioned at different points of the cross section of the said beam.

Advantageously, the equipment comprises a beam intensity control device, capable of varying the said intensity during the scanning of the beam.

The said beam intensity control device can be an optical attenuator capable of receiving the beam from the said emitter.

The equipment can also advantageously comprise a mirror carried by the said second motorized slide, to deflect the said beam towards the said portion of photosensitive waveguide.

BRIEF DESCRIPTION OF THE DRAWINGS

The equipment preferably comprises at least one optical element for focusing the said beam on the said portion of photosensitive waveguide.

The invention is described below with particular reference to the following figures which represent a preferred, but non-restrictive, embodiment of the invention:

FIG. 3b: reflection spectrum of a chirped Bragg grating;

DETAILED DESCRIPTION OF THE INVENTION

Figure 4:
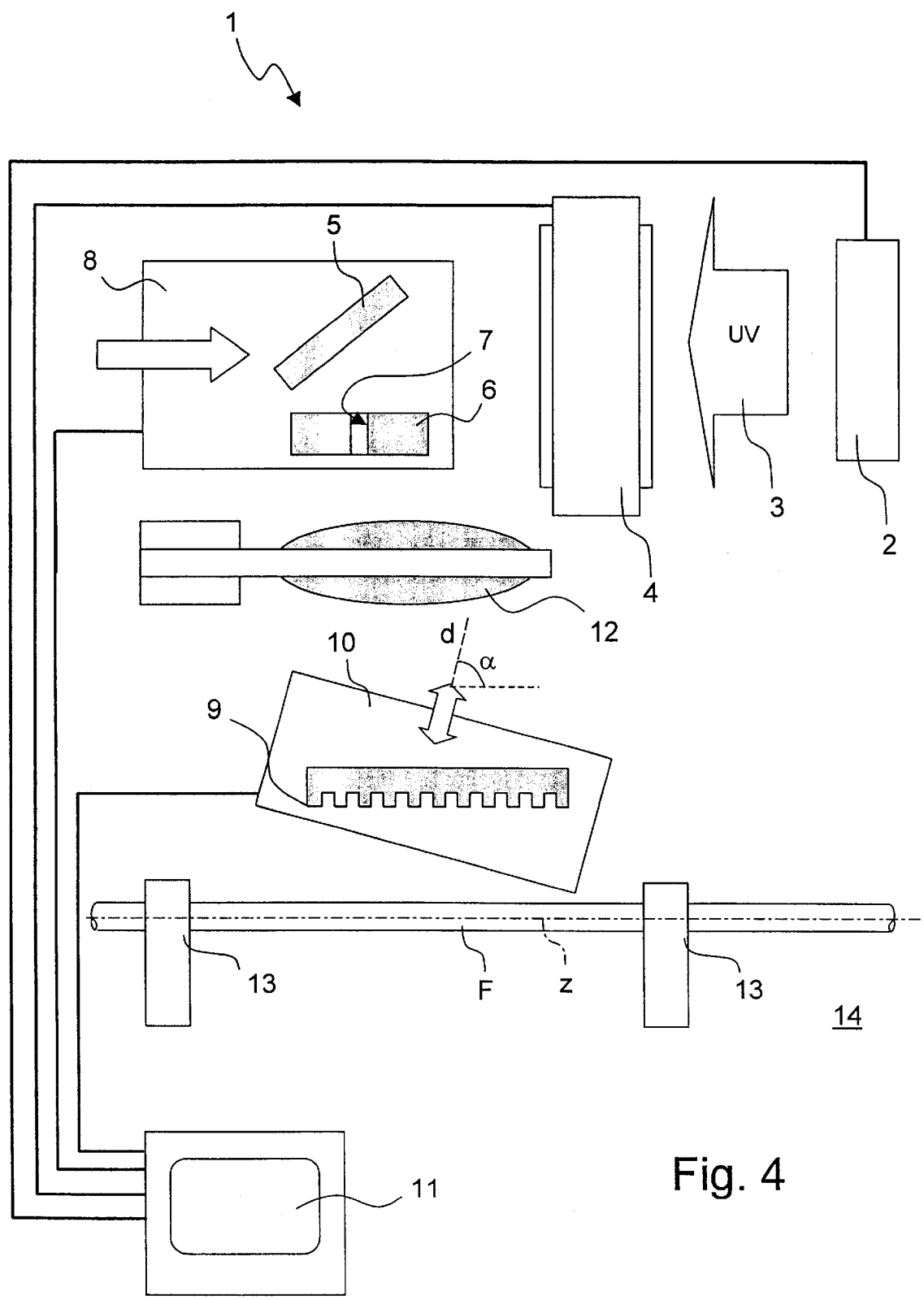
FIG. 4: first embodiment of equipment for writing gratings according to the present invention.

In FIG. 4, the number 1 indicates, as a whole, equipment for writing a Bragg grating in a waveguide, which in this particular case is an optical fibre F, mounted on an optical bench 14.

The equipment 1 comprises a pair of supports 13 of a known type, positioned on the optical bench 14 at a predetermined distance from each other and capable of supporting in a rectilinear position the portion of fibre F on which the grating is to be written, a laser source 2 capable of generating a laser beam 3 at a predetermined ultraviolet wavelength $\lambda_{UV}$, a variable attenuator 4 capable of attenuating the intensity of the beam 3, a mirror 5 (orientated at 45° for example) for deflecting the beam 3 towards the fibre F and a screen 6 provided with a slit 7 to allow a predetermined fraction of the laser beam 3 to pass.

The equipment also comprises a first slide 8 capable of translating the mirror 5 and the screen 6 parallel to the fibre F, a phase mask 9 positioned so that it faces the fibre F and capable of generating UV interference fringes from the laser beam 3 (more precisely, from the fraction of the beam transmitted through the slit 7), a second slide 10 capable of moving the phase mask 9 with a translatory and oscillatory motion in a direction d inclined at a predetermined angle α to the direction defined by the fibre F during the writing process, and, finally, a control and processing unit 11 (referred to hereafter as a "computer") connected to the laser source 2, to the attenuator 4 and to the slides 8 and 10 to control their operation. Preferably, the phase mask 9 is positioned parallel to the fibre F and also remains parallel to the fibre F during the translation and oscillation produced by the second slide 10.

There is also a cylindrical lens 12 (or, more generally, one or more optical elements), preferably positioned between the screen 6 and the phase mask 9 and capable of focusing the laser beam 3 on the fibre F. More precisely, the cylindrical lens 12 is orientated with its focusing axis orthogonal to the z axis of the fibre F.

The laser source 2 can be, for example, a commercial Kr-F (krypton-fluorine) excimer laser with an unstable resonator, operating at a central wavelength $\lambda_{UV}$ of 248 nm. This type of source can supply an energy of up to 450 mJ and can be operated in pulsed mode up to a maximum repetition frequency of 200 pps (pulses per second).

The attenuator 4 enables the intensity of the laser beam 3 to be controlled while the operating parameters of the laser source 2 are kept constant. The attenuator 4 can be a typical attenuator capable of operating with excimer lasers, for example a double-plate attenuator such as the Optec AT4020 Energy Attenuator made by Optec s.a. of Hornu, Belgium.

The first slide 8 must enable the mirror 5 and the screen 6 to be moved parallel to the fibre F over a distance at least equal to the length of the grating which is to be produced.

The slide 8 is preferably a motorized slide which can be controlled by the computer 11 and has a minimum step (movement resolution) suitable for providing the requisite resolution of the grating. For example, the first slide 8 can be the M-UTM-50CC1-HL model produced by the Newport company of Irvine, Calif., USA, which has a movement range of 50 mm, a maximum velocity of 20 mm/s and a movement resolution of 1 μm.

The slit 6 has a width smaller than the dimensions of the beam 3, to reduce these dimensions to values much lower than those of the phase mask 9. For example, the slit 7 can have a width of 1.5 mm. The slit 7 must be large enough not to produce diffraction phenomena and sufficiently small to provide the desired resolution of the grating.

The second slide 10 must permit the movement of the phase mask 9 in the direction d, both for carrying the mask 9, before the start of the writing process, from a rest position to an operating position (which is preferably different in the two scans), and to move the mask 9 with an oscillatory motion around the operating position during the first scan. The amplitude of this oscillation, measured along an axis parallel to the z axis of the fibre F, is preferably a few times greater than the spatial period of the grating which is to be produced (in other words a few times greater than half of the period of the phase mask 9), so that the spatial displacement between the interference fringes generated in successive instants is essentially random. In the case of a variable-period phase mask, the term "period of the phase mask" denotes the "local" period of the phase mask.

By a suitable choice of the oscillation frequency relative to the scanning velocity of the beam 3, it is therefore possible to generate successive interference fringes whose contributions are such that there is an essentially modulation-free variation of the refractive index along the z axis of the fibre F. In other words, the interference fringes obtained in this way make, on average, an essentially zero contribution to the modulation of the refractive index.

The second slide 10 can be, for example, the M-UTM-25CC.1 model produced by the Newport company of Irvine, Calif., USA, which has a movement range of 25 mm and a movement resolution of 0.1 μm. The angle α of inclination of the direction d to a direction parallel to the axis of the fibre is greater than 0° and smaller than 90°, being for example in the range from 75° to 85°. This angle must be chosen making allowance for the distance through which the mask 9 has to be moved to pass from the rest position to the operating position (of the order of tens of millimeters) and for the amplitude of the required oscillation (of the order of hundreds of microns).

The phase mask 9 is preferably a periodic mask with a period $\Lambda_m$, capable of generating periodic interference fringes with a period $\Lambda=\Lambda_m/2$. The useful area of the phase mask 24 can have different geometries; for example it can be rectangular or circular. The phase mask 9 can, for example, be the PM-248-1.066-25.4 model made by the Lasiris company of Saint-Laurent, Quebec, Canada. This model is suitable for. use with KrF excimer lasers and has a useful area of circular shape with a diameter of 15 mm.

The computer 11 has loaded into it a calculation program which, in the way described below, can be used to process a plurality of initial parameters set by the operator, and consequently to generate a plurality of control signals for the laser source 2, the attenuator 4 and the slides 8 and 10. In greater detail, the computer 11 is provided with a "Digital Input Output" board for sending the control signals to the laser source 2 (thus forming a control circuit) and to the attenuator 4, and a GPIB (General Purpose Interface Bus) card for sending the control signals to the slides 8 and 10.

The list below shows the principal parameters (other parameters will be indicated subsequently) which have to be set in the computer 11 before the start of the writing process, together with typical ranges of values for these parameters:

| | |
|---|---|
| total writing time: | 100–300 s; |
| grating length: | 5–20 mm; |
| width of slit 7: | 0.6—1.5 mm; |
| movement step of the first slide 8: | 10–50 μm; |
| movement step of the second slide | 1–10 μm; |
| characteristics of the desired apodization curve: for example, in the case of a modulation Δn of the "super-Gaussian" type with its extreme values normalized to zero, the curve can be expressed by the function | |

$$\Delta n(z) \propto \frac{\exp\left\{-\left|\frac{z}{\sigma \cdot L}\right|^q\right\} - \exp\left\{-\left|\frac{1}{2\sigma}\right|^q\right\}}{1 - \exp\left\{-\left|\frac{1}{2\sigma}\right|^q\right\}} \quad (5)$$

in which L is the length of the grating and σ is the variance (normalized with respect to the length of the grating), and the parameters to be set are σ and the exponent q.

The equipment 1 enables an in-fibre grating to be produced by the method described below.

In a preliminary step, the computer 28 is pre-set with values of the aforesaid operating parameters suitable for the production of a Bragg grating with predetermined characteristics, for example an apodized grating. Additionally, the portion of optical fibre F on which the grating is to be written is placed in the writing position, in other words in a rectilinear position between the two supports 13, and the phase mask 9 is moved by means of the second slide 10 from the rest position to the first operating position in which it faces the fibre F and is at a predetermined distance from it. The distance between the mask and the fibre can be, for example, approximately 12 mm when the mask 9 is in the rest position and approximately 500 μm when the mask is in the first operating position.

The laser source 2 is then activated to emit the laser beam 3 (with a predetermined intensity). This beam passes through the attenuator 4, undergoing an attenuation which is controlled at every instant by the computer 11, and then reaches the mirror 5, which directs it towards the fibre F essentially in a direction which is orthogonal to the fibre F. The beam 3 then reaches the slit 7, which allows only a central portion of the beam to pass. The lens 12 focuses the portion of beam 3 emerging from the slit 7 towards the fibre F, and the phase mask 9 generates from this portion of beam 3 interference fringes which strike the photo-refractive part of the fibre F and change its refractive index.

Additionally, the first slide 8 is moved so that the mirror 5 and the screen 6 are translated parallel to the fibre F according to a first law of movement (in particular, with a first law of variation of the velocity), determined by the computer 11 according to the pre-set parameters, to carry out a first scan with the beam 3 on the fibre F. In particular, the first law of movement is selected in such a way as to provide a predetermined variation of the local mean refractive index $n_0$. During the first scan, the phase mask 9 is moved with an oscillatory motion by means of the second slide 10 (according to the commands received from the computer 11) along the direction d, about the first operating position. As described previously, the amplitude and frequency of this oscillation are selected in such a way that the contributions of the interference fringes generated in successive instants compensate for each other. The refractive index therefore undergoes an essentially zero modulation.

Figure 5A:
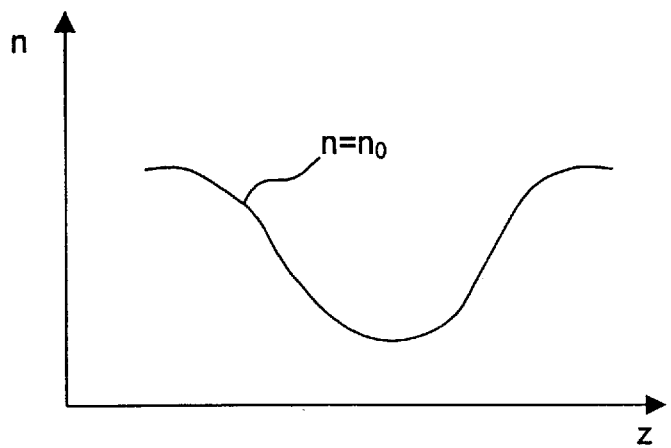
FIGS. 5a, 5b and 5c: qualitative variation of the refractive index obtainable, respectively, in a first stage, in a second stage and at the end of the whole process of producing an apodized Bragg grating according to the method of the present invention.

FIG. 5a shows the qualitative variation of the refractive index obtained by the first scan, in the case of the writing of an apodized grating. Since the modulation of the refractive index is zero as a result of the oscillation, the variation of the refractive index n coincides with the variation of the local mean refractive index $n_0$. The first scan therefore makes it possible to obtain a first curve of the refractive index.

Advantageously, the distance between the mask and the fibre, during the first scan, is in the range from 100 $\mu$m to 1000 $\mu$m, preferably from 200 $\mu$m to 800 $\mu$m, and more preferably from 400 $\mu$m to 600 $\mu$m. The oscillation of the phase mask 9 can, for example, take place about an equilibrium position (coinciding with the first operating position) at a distance of 500 $\mu$m from the fibre F and can have an amplitude of ±100 $\mu$m.

Figure 5B:
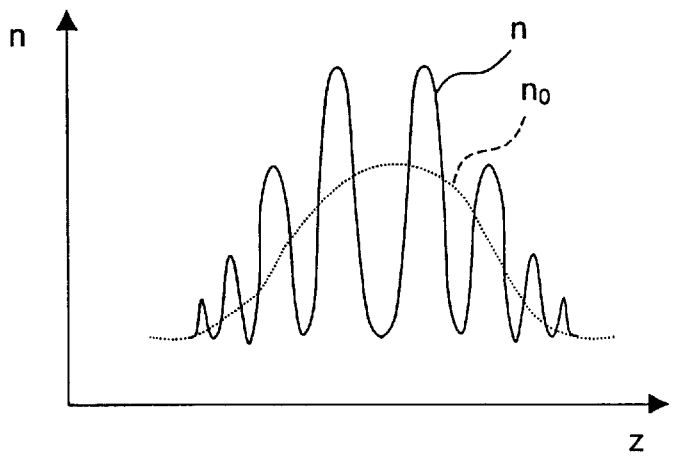

At the end of the first scan, the second slide 10 is activated to bring the phase mask 9 into the second operating position, at a predetermined distance from the fibre F, to enable the second scan to be carried out. This distance can be, for example, 100 $\mu$m. The second scan is carried out by activating the first slide 8 to translate the mirror 5 and the screen 6 parallel to the fibre F according to a second law of movement determined by the computer 11 (according to the pre-set parameters) in such a way that a predetermined variation of the local mean refractive index is obtained, and with the phase mask 9 in a fixed position in such a way that the desired modulation of the refractive index is generated. FIG. 5b shows the qualitative variation of the refractive index n obtained with the second scan, in the case of the writing of an apodized grating. The same figure also shows the variation of the local mean refractive index $n_0$.

Preferably, the second scan is carried out in the direction opposite to that of the first scan, starting from the position reached by the first slide 8 at the end of the first scan. Alternatively, the first slide 8 can be repositioned in the starting position of the first scan, to carry out the second scan in the same direction as the first. The second scan enables the desired variation of the envelope of the refractive index to be obtained.

Figure 5C:
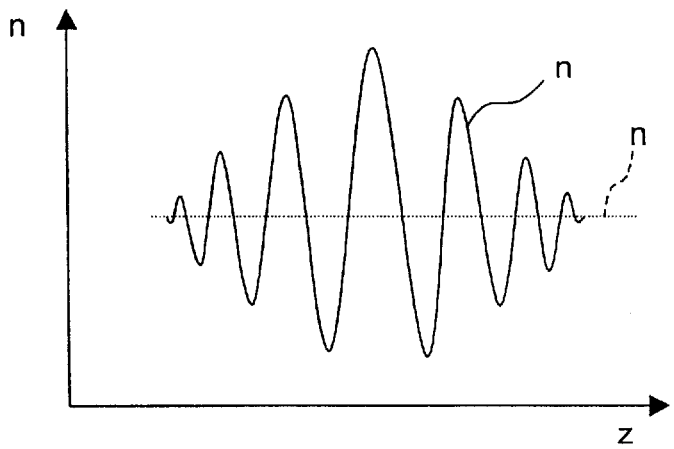

At the end of the process, a variation of the refractive index produced by the superimposition of the effects of the two scans is obtained. In the case of an apodized grating, a curve such as that shown in FIG. 5c is obtained.

The equations governing the law of movement of the two slides 8 and 10 during the two scans are as follows, assuming an essentially linear dependence of the variation of the refractive index on the UV energy incident on the fibre F:
First Scan
For the first slide 8:

$$\delta t_1(z) = \beta \cdot n_0(z) + \gamma - \frac{T}{\int_0^L a(z)dz} \cdot a(z) \tag{6}$$

where $\delta t(z)$ is the time elapsed on the z co-ordinate, $a(z)$ is the desired apodization curve, $n_0(z)$ is the desired variation of the local mean value of the refractive index, L is the length of the grating, T is the total exposure time, and $\beta$ and $\gamma$ are process constants to be set before the start of the process, according to other process parameters (including the energy of the laser, the frequency of repetition of the pulses, the attenuation of the attenuator 4 and, if appropriate, the quantity of deuterium added to the fibre to increase its photo-refractivity).

For the second slide 10:

$$\xi = \xi_0 + \delta\xi \cdot \cos\left(\frac{2\pi}{t_0} \cdot t\right) \tag{7}$$

where $\xi$ is the co-ordinate along the direction d and $t_0$ is the temporal period of the oscillation.
Second Scan
For the first slide 8:

$$\delta t_2(z) = \frac{T}{\int_0^L a(z)dz} \cdot a(z) \tag{8}$$

For the second slide 10:

$$\xi = \bar{\xi} \tag{9}$$

The parameters of the first and second laws of movement are selected as follows. First of all, the law of movement of the second scan is selected in such a way as to produce the desired modulation of the refractive index. The law of movement of the first scan is then selected in such a way that the variation of the local mean value no of the refractive index associated with the second scan is pre-compensated by the variation of the refractive index of the first scan, thus providing the desired final variation of $n_0$. In the case illustrated in FIGS. 5a–5c, the law of movement of the first scan is selected in such a way as to provide a constant final value of $n_0$.

By suitable selection of the laws of movement for the two scans in the way described above, it is possible to obtain the desired profile of the refractive index in the fibre F, and therefore it is possible to obtain a Bragg grating with the desired characteristics. This is because the spectral properties of a grating are determined, as explained above, by the profile of the refractive index n along its axis z. In order to point out the contributions of the two scans to the variations of the refractive index, the relation (2) introduced previously can be rewritten in the following form:

$$n(z) = n_1(z) + n_2(z) \cdot [1 + v \cdot \sin(2\pi z/\Lambda(z))] \tag{10}$$

where the term $n_1(z)$ is the contribution to the local mean refractive index generated along the fibre during the first scan and the term $n_2(z)$ is the contribution to the local mean refractive index generated along the fibre during the second scan. The modulation produced by the second scan has an envelope $\Delta n(z)$ defined by:

$$\Delta n(z) = n_2(z) \cdot v \tag{11}$$

where v is the visibility of the interference fringes, defined by the relation (4).

Figure 1A:
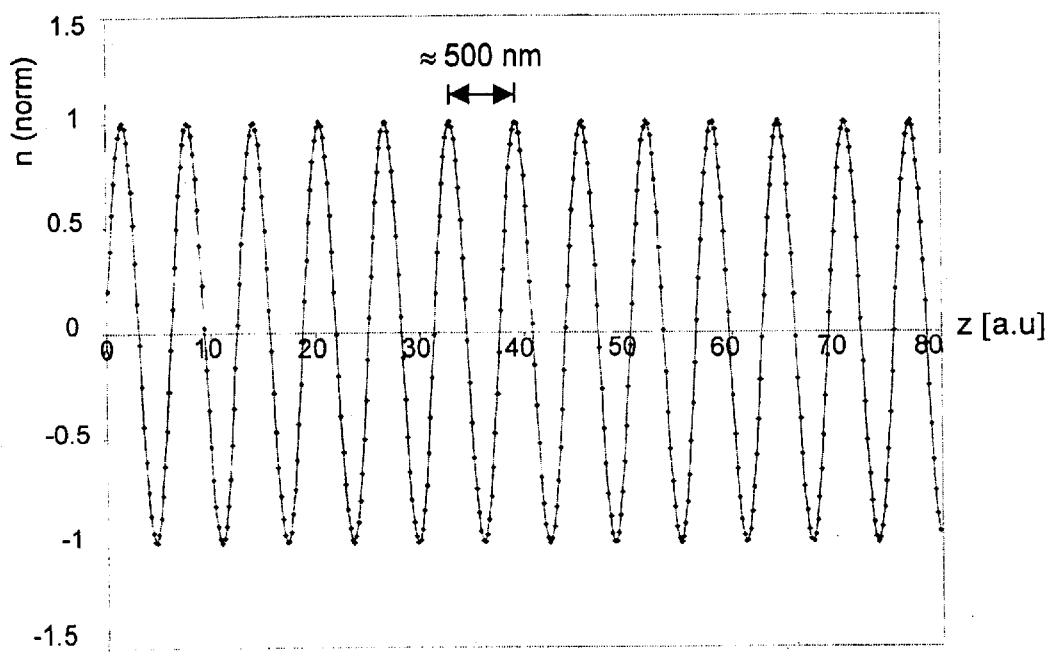
FIG. 1a: variation of the refractive index (with respect to its mean value) in a uniform Bragg grating.
Figure 1B:
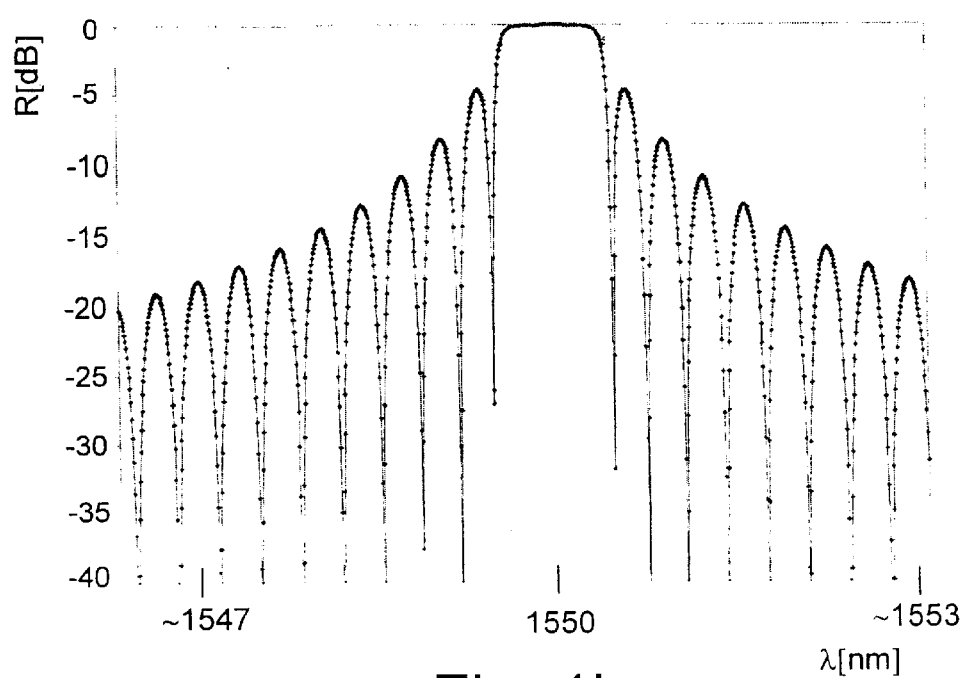
FIG. 1b: reflection spectrum of a uniform Bragg grating.
Figure 2A:
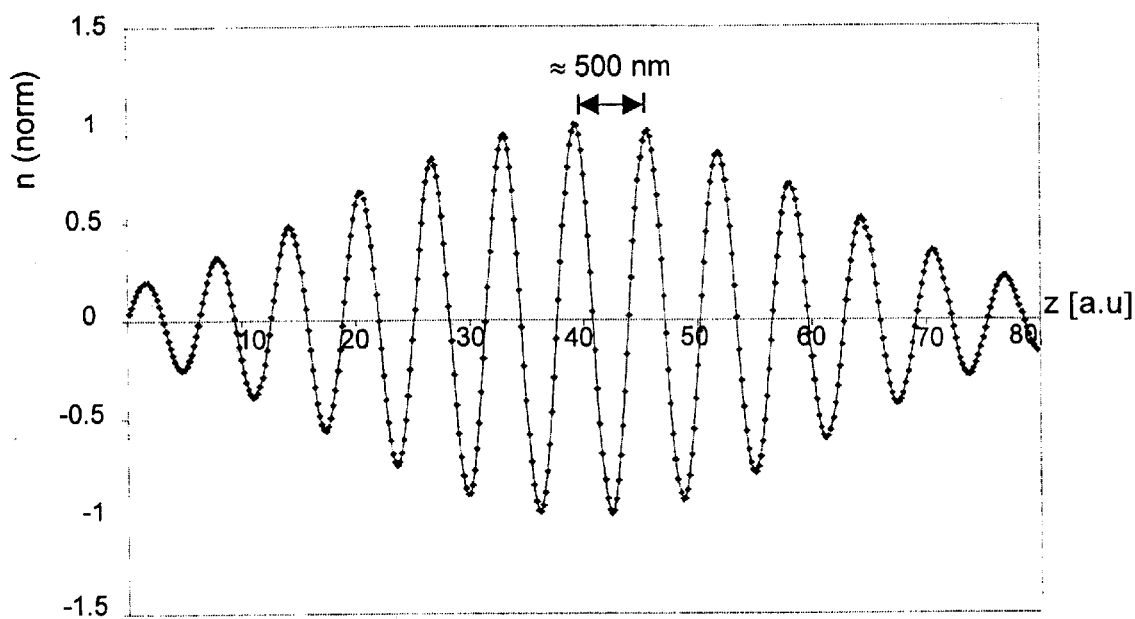
FIG. 2a: variation of the refractive index (with respect to its mean value) in an apodized Bragg grating.
Figure 2B:
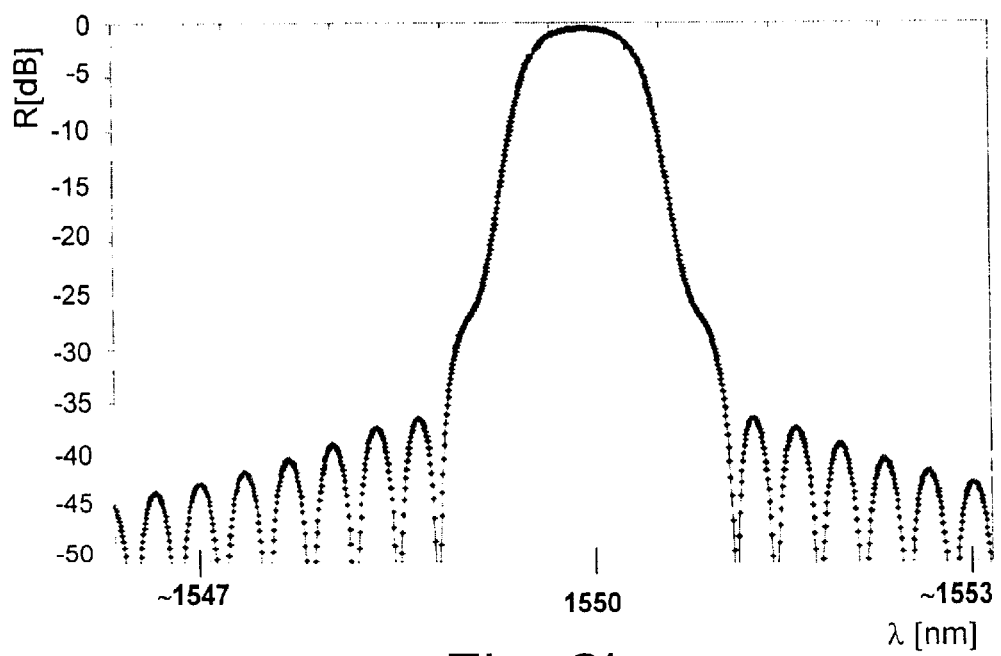
FIG. 2b: reflection spectrum of an apodized Bragg grating.

The particular variation of the refractive index must be selected according to the type of grating which is to be produced. For example, a narrow-band apodized grating can be obtained by suitably modulating the envelope $\Delta n(z)$, and holding the total local mean refractive index constant (as shown in FIG. 2a), where this parameter is defined by:

$$n_0(z) = n_1(z) + n_2(z) \tag{12}$$

Figure 3A:
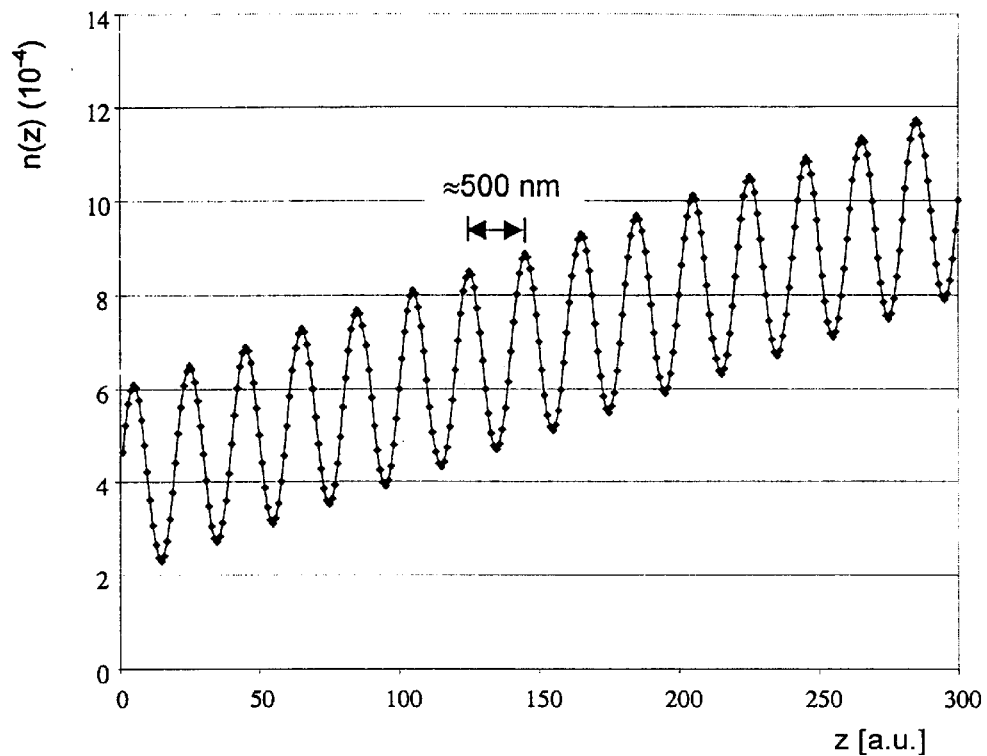
FIG. 3a: variation of the refractive index in a chirped Bragg grating with a variable mean refractive index.
Figure 3B:
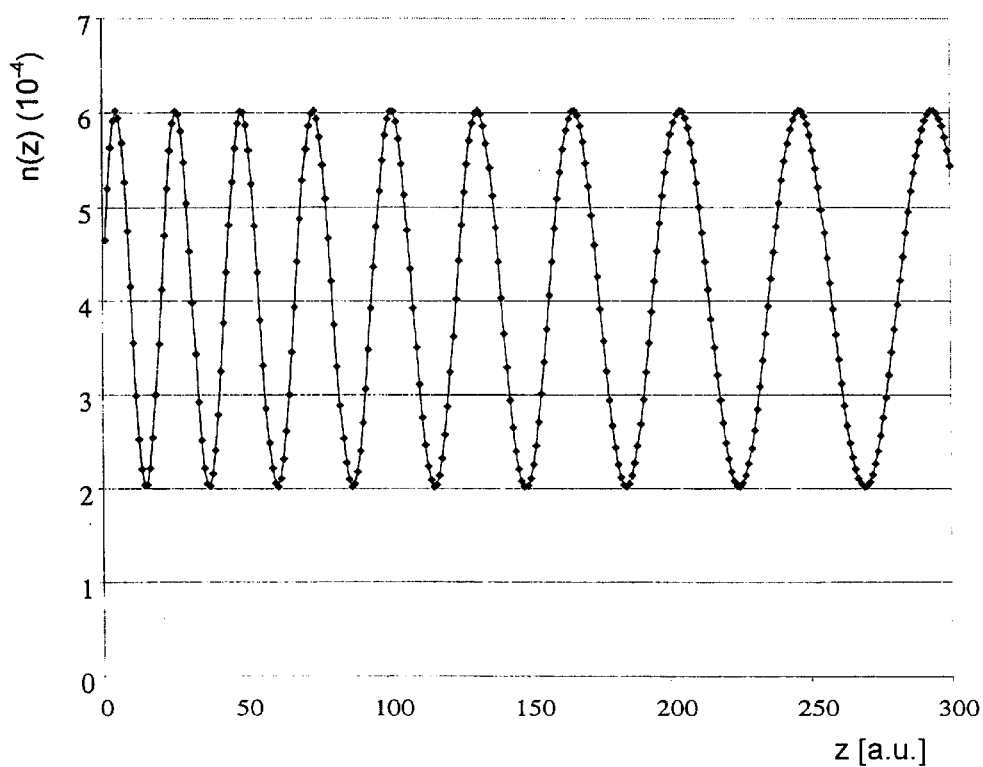
FIG. 3b: variation of the refractive index in a chirped Bragg grating with a variable spatial period.
Figure 3C:
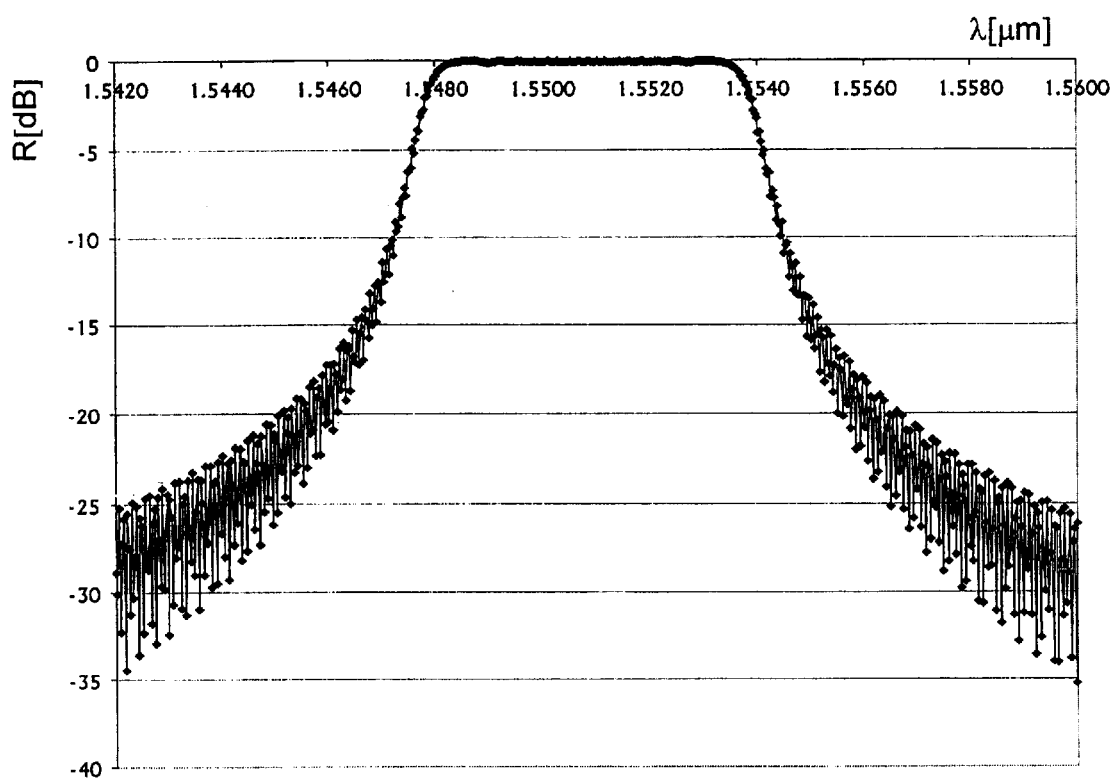

On the other hand, a non-apodized "chirped" grating can be obtained by varying the value of $n_0(z)$, for example by incrementing it linearly along the axis of the fibre F, and holding $\Delta n(z)$ (and therefore $n_2(z)$) constant (as shown in FIG. 3a). To obtain apodized "chirped" gratings, however, both $n_0(z)$ and $\Delta n(z)$ must be varied.

The equipment 1 according to the invention therefore permits the separate and local control (at the different points along the axis z of the fibre F) of the parameters $n_0(z)$ and $\Delta n(z)$, and therefore makes it possible to obtain a grating with the desired characteristics.

Figure 6:
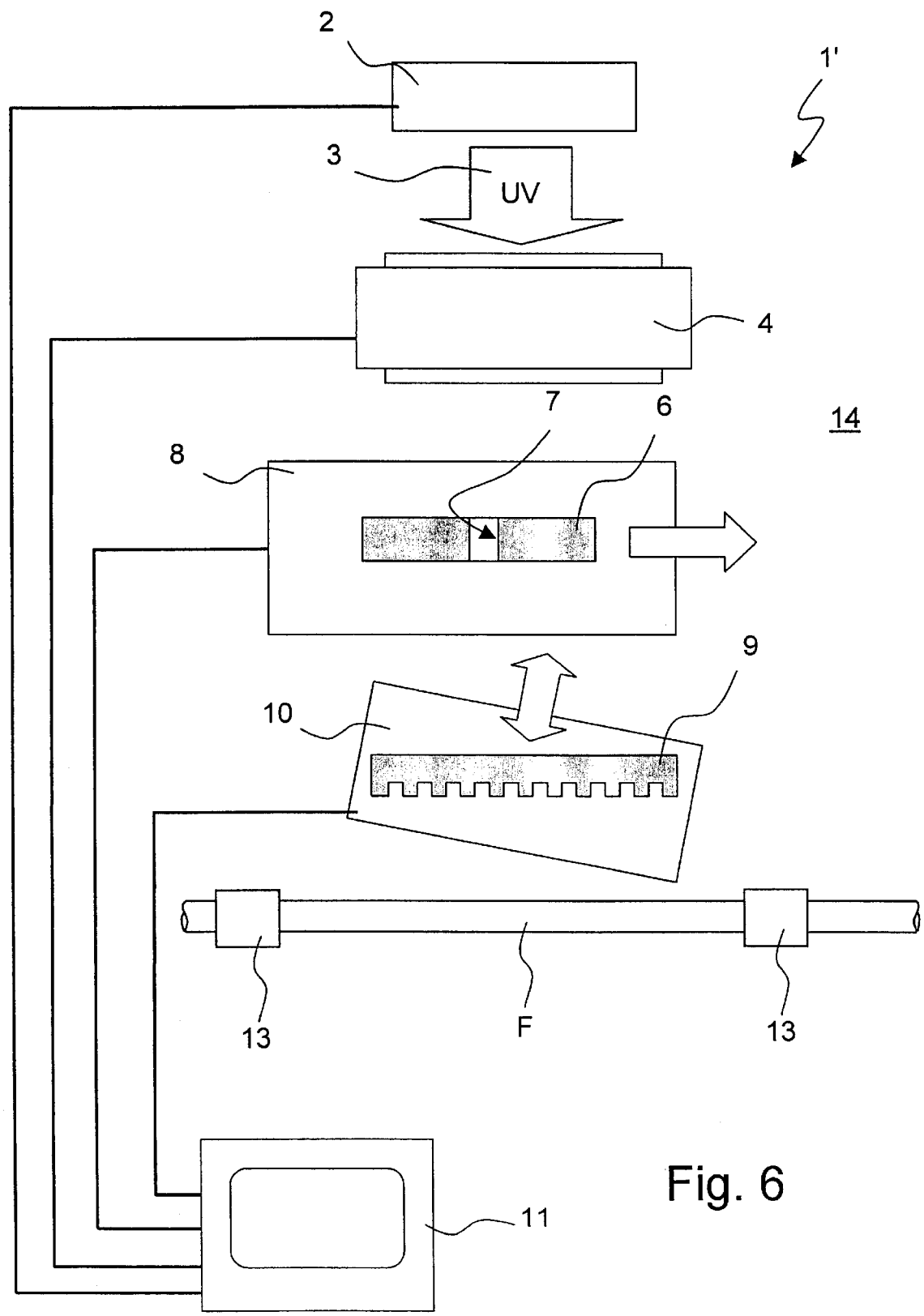
FIG. 6: second embodiment of equipment for writing gratings according to the present invention.

FIG. 6 shows a further embodiment of the equipment according to the invention, indicated here by 1'. The equipment 1' differs from the equipment 1 primarily in that the laser source 2 is orientated in such a way that the beam 3 is sent directly to the fibre F (orthogonally to the fibre). Additionally, the attenuator 4 is orientated in such a way as to attenuate the beam 3 along this direction, and the mirror 5 is absent. The first slide 8 allows therefore to translate the screen 6 parallely to the fibre F so as to enable different portions of the fibre F to be illuminated in successive instants. To simplify the representation, the lens 12, which is also preferably present in this embodiment, is not illustrated. By contrast with the process in the equipment 1, in which the reflection by the mirror 5 and the simultaneous translation of the mirror 5 and the screen 6 enabled the same fraction of the beam 3 (preferably a central fraction of the beam) to be directed towards the fibre F at all times, in the equipment 1' the fibre F receives from the slit 7 differing fractions of the beam 3, because of the movement of the slit 7 relative to the beam 3 emerging from the attenuator 4. The writing conditions are therefore less uniform for the equipment 1'. If necessary, the attenuator 4 can be controlled in such a way as to compensate for the energy variations due to this lower uniformity of the writing conditions.

Experimental Test

The applicant carried out an experimental measurement to verify the effectiveness of the equipment according to the invention in writing an apodized Bragg grating with a high degree of suppression of the secondary lobes in the spectral response. This test was conducted with the configuration of FIG. 4 and with the following parameters set in the computer 11 before the test:

| | |
|---|---|
| total writing time: | 300 s; |
| pulse repetition frequency: | 150 pps; |
| length of grating: | 12 mm; |
| width of slit 7: | 1 mm; |
| angle α between the direction d of displacement of the second slide 10 and a direction parallel to the axis of the fibre F: | 80°; |
| distance between mask and fibre during the first scan, in the equilibrium position: | 500 μm; |
| amplitude of the oscillation of the mask during the first scan: | ±100 μm; |
| number of oscillations of the mask during the first scan: | 40 (in 150 s); |
| distance between mask and fibre during the second scan: | 100 μm; |
| attenuation of the attenuator 4: | 20%; |
| apodization parameters, assuming a "super-Gaussian" variation of the envelope Δn: variance σ (normalized to the length of the grating) 0.3, exponent 2.2. | |

A PM-248-1.066-25.4 phase mask, with a period of 1.066 μm, made by the Lasiris company of Saint-Laurent, Quebec, Canada, was used for this measurement.

Figure 7A:
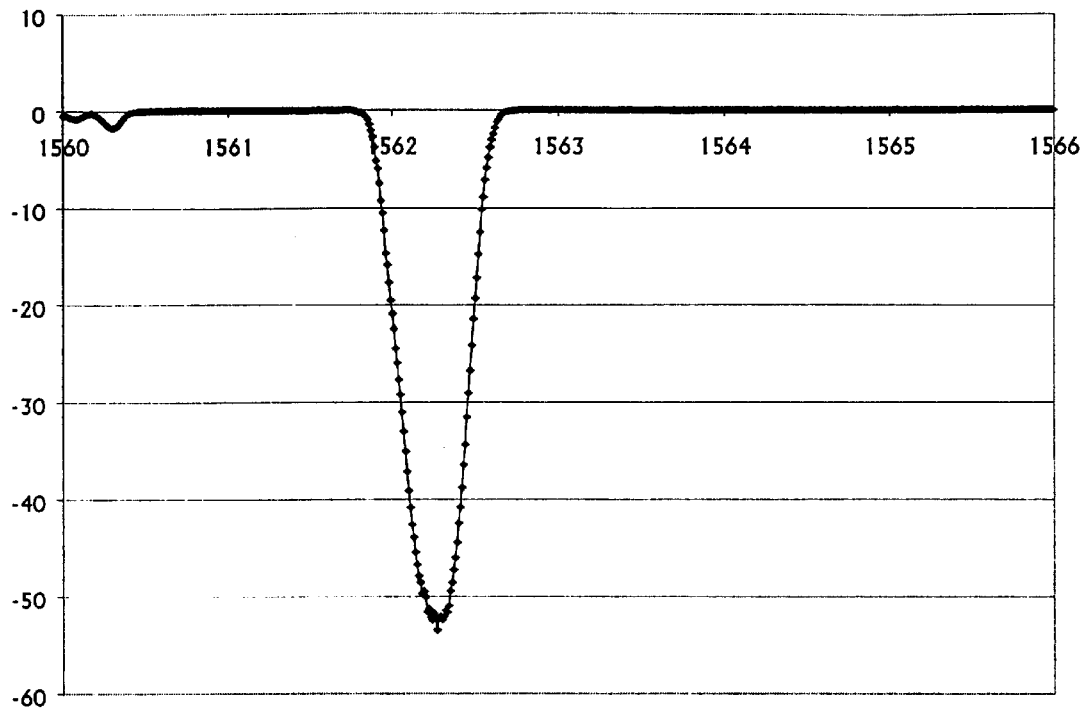
FIGS. 7a, 7b: results of experimental measurements.
Figure 7B:
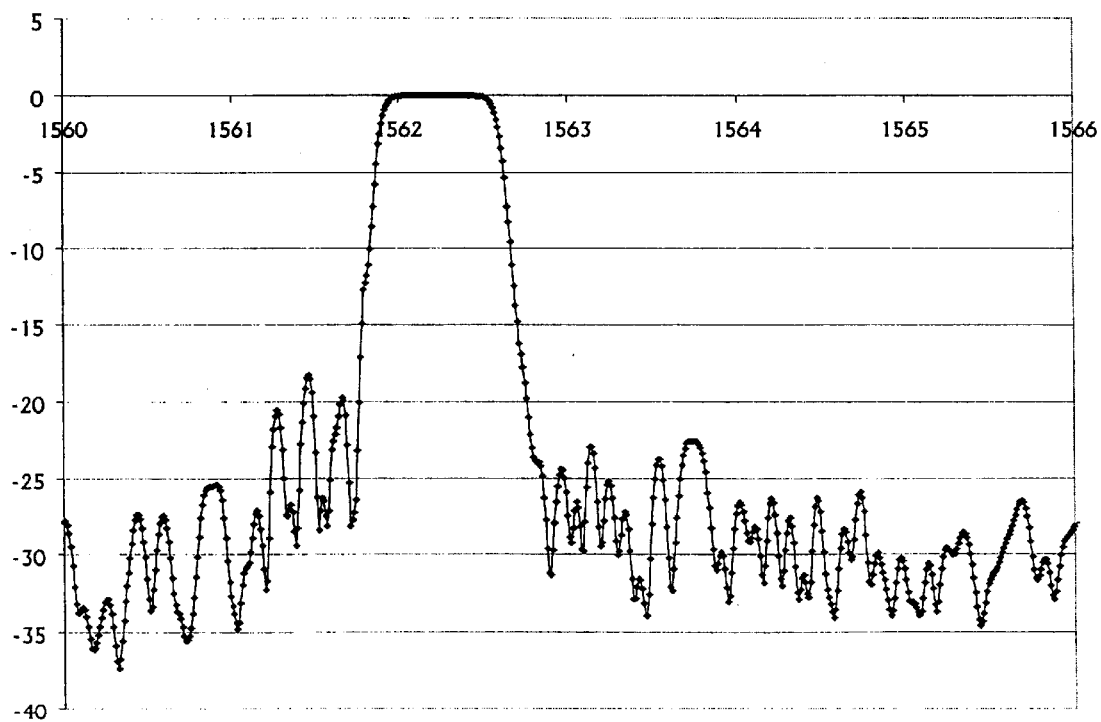

FIGS. 7a and 7b illustrate, respectively, the transmission spectrum and the reflection spectrum (in dB) of the grating thus produced. The reflection spectrum shows that the secondary lobes are particularly low, being at least 18 dB lower than the principal lobe.

Clearly, although the equipment and the method according to the invention are particularly suitable for the production of apodized gratings, they can be used for writing non-apodized gratings without structural or conceptual modifications. For example, in order to write chirped, apodized or non-apodized gratings simply, it is sufficient to set a linear variation of the mean refractive index no by adjusting the total energy sent to the fibre. Alternatively, by using a phase mask of the chirped type, it is possible to produce an apodized chirped grating, in which the apodization is carried out by the technique described above, while the total intensity of the radiation produced by the two exposures is held constant.

Finally, it is evident that other modifications, variations, replacements and additions may be carried out on the embodiments described above without thereby departing from the scope of the present invention.

For example, the order of the two scans could be reversed: in other words, the scan with the fixed mask could be carried out first and the scan with the oscillating mask carried out afterwards.

Additionally, in the configuration of FIG. 4, the screen 6 could be positioned between the cylindrical lens 12 and the phase mask 9 and could be carried by a support integral with the first slide 8. In this case, it would be possible to have a particularly low distortion of the beam 3 reaching the phase mask 9.

As a further alternative, the screen 6 could be placed in a fixed position between the attenuator 4 and the mirror 5. This positioning of the screen 6 is less preferable, since an increase in the distance between the screen and the phase mask 9 increases the distortion of the beam 3 reaching the phase mask 9.

The attenuator 4 could, if necessary, be absent, in which case the energy of the beam 3 could be controlled by varying the operating conditions of the laser source 2 during the process.

Additionally, as an alternative to the control of the scanning velocity in the first and second scan (achieved by controlling the velocity of the first slide 8), it is possible to control the intensity of the electromagnetic energy reaching the fibre F by modulating the transmittivity of the attenuator 4. In this case, in both the first and the second scan, the velocity of the first slide 8 (and therefore the scanning velocity) is held constant and the attenuator 4 is controlled in such a way that the quantity of UV energy reaching the fibre F locally is such that the desired variation of the local mean refractive index is generated.

A less preferable alternative consists in carrying out the scanning of the beam 3 on the fibre F by translating the fibre F along its axis, together with the phase mask 9 and the supports 13, by means of a suitable slide (not illustrated).

The laser source 2 could also be of any type, provided that it enables the photo-refractive effect of the fibres to be exploited.

Additionally, the beam 3 could be focused on the fibre F, not by means of the lens 12 (or other equivalent optical element), but by means of a concave mirror or one with a reflective surface of another shape, used in place of the mirror 5.

The waveguide on which the grating is written could be an integrated optics waveguide, as an alternative to an optical fibre F.

Finally, a microcontroller could be provided in place of the computer 11.

What is claim is:

1. A method for writing a Bragg grating in a waveguide, comprising:

placing a photosensitive waveguide in a writing position in which the waveguide extends essentially along one axis;

generating a beam of ultraviolet radiation;

executing a first and a second scan with the beam along the photosensitive waveguide through a phase mask, to generate interference fringes capable of modifying the refractive index along the waveguide in a predetermined way; and moving the phase mask, during one of the first and second scans, with an oscillatory motion about an equilibrium position and along a direction of movement lying at a nonzero angle of less than 90° to the axis.

2. The method according to claim 1, comprising varying an energy of the ultraviolet radiation along a portion of the photosensitive waveguide during at least one of said first and second scans.

3. The method according to claim 2, wherein the varying of the energy of the ultraviolet radiation along the portion of the photosensitive waveguide comprises varying the scanning velocity of said beam.

4. The method according to claim 2, wherein the varying of the ultraviolet radiation energy along the portion of the photosensitive waveguide comprises varying an intensity of the beam.

5. The method according to claim 4, wherein the varying of the intensity of the energy of the beam comprises applying variable attenuation to the beam.

6. The method according to claim 1, wherein the direction of movement lies at an angle of more than 0° to said axis, and further comprising translating the phase mask along the direction of movement before at least one of said first and second scans, to position the phase mask at a predetermined distance from the waveguide.

7. The method according to claim 1, wherein the oscillatory movement has an amplitude and a frequency which are selected such that said interference fringes have essentially random phases with respect to each other.

8. The method according to claim 1, further comprising transmitting said beam through a slit of predetermined dimensions.

9. The method according to claim 1, wherein the executing a first and second scan with the beam comprises the steps of deflecting the beam by means of a mirror and translating the mirror parallel to the portion of the photosensitive waveguide.

10. The method according to claim 1, wherein the second scan is carried out in a direction opposite to that of the first scan.

11. An equipment for writing a Bragg grating in a photosensitive waveguide, comprising:

an emitter of a beam of ultraviolet radiation;

supporting elements for the waveguide, to place a portion of the photosensitive waveguide in a writing position essentially along a predetermined axis and along a path of the beam;

a phase mask placed on the path in a position such that it faces the portion of the photosensitive waveguide when said portion of photosensitive waveguide is in the writing position; and a device for scanning with the beam along the portion of photosensitive waveguide through said phase mask;

the equipment further comprising a movement device carrying the phase mask and capable of moving said phase mask with an oscillatory motion in a direction lying at a nonzero angle of less than 90° to the axis.

12. The equipment according to claim 11, wherein the movement device is capable of translation in the direction to position said phase mask at a predetermined distance from said waveguide.

13. The equipment according to claim 11, wherein the movement device comprises a first motorized slide.

14. The equipment according to claim 13, characterized in that it comprises a screen provided with a slit positioned on the path before the phase mask, the slit having a dimension smaller than the cross section of the beam.

15. The equipment according to claim 14, wherein the device for scanning comprises a second motorized slide carrying the screen and having a direction of movement orthogonal to the beam so that the slit can be positioned at different points of the cross section of said beam.

16. The equipment according to claim 11, further comprising a beam intensity control device, capable of varying intensity during the scanning with the beam.

17. The equipment according to claim 16, wherein said beam intensity control device is an optical attenuator capable of receiving the beam from the emitter.

18. The equipment according to claim 15, further comprising a mirror carried by the second motorized slide to deflect the beam towards the portion of the photosensitive waveguide.

19. The equipment according to claim 11, further comprising at least one optical element for focusing the beam on the portion of the photosensitive waveguide.

20. The equipment according to claim 11, wherein the phase mask is a periodic mask.

* * * * *

UNITED STATES PATENT AND TRADEMARK OFFICE
CERTIFICATE OF CORRECTION

PATENT NO. : 6,591,039 B2
DATED : July 8, 2003
INVENTOR(S) : Rondeihella et al.

It is certified that error appears in the above-identified patent and that said Letters Patent is hereby corrected as shown below:

<u>Title page,</u>
Item [73], Assignee, should read -- Corning O.T.I. SpA, Milan (IT) --

Signed and Sealed this

Second Day of March, 2004

JON W. DUDAS
*Acting Director of the United States Patent and Trademark Office*